United States Patent
Schwerdtner et al.

(10) Patent No.: US 8,437,057 B2
(45) Date of Patent: May 7, 2013

(54) METHOD FOR RENDERING AND GENERATING COLOR VIDEO HOLOGRAMS IN REAL TIME

(75) Inventors: Armin Schwerdtner, Dresden (DE); Alexander Schwerdtner, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 552 days.

(21) Appl. No.: 12/600,357

(22) PCT Filed: May 16, 2008

(86) PCT No.: PCT/EP2008/056025
§ 371 (c)(1),
(2), (4) Date: Nov. 16, 2009

(87) PCT Pub. No.: WO2008/138982
PCT Pub. Date: Nov. 20, 2008

(65) Prior Publication Data
US 2010/0149314 A1    Jun. 17, 2010

(30) Foreign Application Priority Data
May 16, 2007    (DE) ...................... 10 2007 023 739 U (51) Int. Cl.
    *G03H 1/08*    (2006.01)
(52) U.S. Cl.
    USPC .............................................................. 359/9
(58) Field of Classification Search .................... 348/41; 359/9, 22
    See application file for complete search history.

(56) References Cited

U.S. PATENT DOCUMENTS

| | | | |
|---|---|---|---|
| 5,793,503 A * | 8/1998 | Haines et al. ...................... 359/9 |
| 5,850,352 A * | 12/1998 | Moezzi et al. ................. 345/419 |
| 6,952,204 B2 * | 10/2005 | Baumberg et al. ............ 345/420 |
| 7,230,746 B2 * | 6/2007 | Cameron et al. ................... 359/9 |
| 7,262,891 B2 * | 8/2007 | Brotherton-Ratcliffe et al. ............................... 359/22 |
| 7,295,200 B2 * | 11/2007 | Cameron et al. .............. 345/419 |
| 7,423,792 B2 * | 9/2008 | Brotherton-Ratcliffe et al. ............................... 359/35 |
| 7,548,360 B2 * | 6/2009 | Brotherton-Ratcliffe et al. ............................... 359/35 |

(Continued)

FOREIGN PATENT DOCUMENTS

| DE | 10 2006 004 300 | 8/2007 |
| DE | 10 2006 025 096 | 11/2007 |

(Continued)

OTHER PUBLICATIONS

International Search Report, dated Oct. 9, 2008, issued in priority International Application No. PCT/EP2008/056025.

(Continued)

*Primary Examiner* — David Eng
(74) *Attorney, Agent, or Firm* — Saul Ewing LLP (57) ABSTRACT

A method is disclosed for rendering and generating color video holograms for a holographic reproduction device having at least one light modulation means, wherein a scene divided into object points is encoded as a whole hologram and which can be seen from as a reconstruction a visibility region, which is located within a periodicity interval of the reconstruction of the video hologram. The visibility region defines a subhologram together with each object point of the scene to be reconstructed and the whole hologram is formed from a superposition of subholograms, wherein a 3D rendering graphic pipeline structures a scene represented by image data with depth information into object points and determines and provides at least color and depth information for the object points.

18 Claims, 6 Drawing Sheets

U.S. PATENT DOCUMENTS

| | | | | |
|---|---|---|---|---|
| 7,636,184 | B2* | 12/2009 | Schwerdtner | 359/9 |
| 7,649,532 | B2* | 1/2010 | Cameron et al. | 345/419 |
| 7,768,684 | B2* | 8/2010 | Cameron et al. | 359/9 |
| 7,929,189 | B2* | 4/2011 | Schwerdtner | 359/9 |
| 7,969,633 | B2* | 6/2011 | Schwerdtner | 359/9 |

FOREIGN PATENT DOCUMENTS

| | | |
|---|---|---|
| DE | 10 2006 042 324 | 3/2008 |
| WO | WO 2004/044659 | 5/2004 |
| WO | WO 2006/027228 | 3/2006 |
| WO | WO 2006/066919 | 6/2006 |
| WO | WO 2006/119760 | 11/2006 |
| WO | WO 2008/025839 | 3/2008 |

OTHER PUBLICATIONS

Lucente, M., "Interactive computation of holograms using a look-up table," J. electronic Imagine, vol. 2(1), pp. 28-34 (Jan. 1993).

Dong-Hwi Lee et al., "Computer-generated holograms generation of a real 3D object using depth-data extracted from integral imaging technique," Proceedings of Spit—The Intl. Society for Optical Engineering, SPIE, vol. 6225, No. 1, pp. 62251D-1 to 62251D-12 (Jan. 1, 2006) XP007905030.

Slinger et al., "Computer-generated holography as a generic display technology," Computer, IEEE Service Center, vol. 38, No. 8, pp. 46-53 (Aug. 1, 2005) XP007903875.

* cited by examiner

METHOD FOR RENDERING AND GENERATING COLOR VIDEO HOLOGRAMS IN REAL TIME

CROSS REFERENCE TO RELATED APPLICATIONS

This application claims the priority of PCT/EP2008/056025, filed on May 16, 2008, which claims priority to German Application No. 10 2007 023739.3, filed May 16, 2007, the entire contents of which are hereby incorporated in total by reference.

BACKGROUND OF THE INVENTION

The present invention relates to a method for rendering and generating colour video holograms in real time from three-dimensional image data with depth information for extending a 3D rendering graphics pipeline.

As regards the rendering process, the invention relates to the 3D rendering pipeline or graphics pipeline, which describes the algorithms from the vectorial, mathematical description of a three-dimensional scene to the pixelated image on the monitor screen. The three-dimensional image data comprise depth information and usually also additional information about material and surface properties. For example, the conversion of screen coordinates into device coordinates, texturing, clipping and anti-aliasing are performed in the 3D rendering graphics pipeline. The pixelated image, which represents a two-dimensional projection of the three-dimensional scene, and which is stored in the frame buffer of a graphics adapter, comprises the pixel values for the controllable pixels of a monitor screen, for example an LC display.

The present invention also relates to an analytic method for computing hologram values for the colour representation of a scene on a holographic display device.

Such a holographic display device is substantially based on the principle that a sub-hologram is defined together with each object point of the scene to be reconstructed and that the entire hologram is formed by superposition of sub-holograms, with the help of at least one light modulator means on which a scene which is divided into object points is encoded as an entire hologram and where the scene can be seen as a reconstruction from a visibility region which lies within one periodicity interval of the reconstruction of the video hologram. In general, the principle is to reconstruct mainly that wave front that would be emitted by an object into one or multiple visibility regions. Such a device is further based on the principle that the reconstruction of an individual object point only requires a sub-hologram as a subset of the entire hologram encoded on the light modulator means.

The holographic display device comprises at least one screen means. The screen means is either the light modulator itself, where the hologram of a scene is encoded, or an optical element—such as a lens or a mirror—onto which a hologram or wave front of a scene encoded on the light modulator is projected. The definition of the screen means and the corresponding principles for the reconstruction of the scene in the visibility region are described in other documents filed by the applicant. In documents WO 2004/044659 and WO 2006/027228, the light modulator itself forms the screen means. In document WO 2006/119760, titled "Projection device and method for holographic reconstruction of scenes", the screen means is an optical element onto which a hologram which is encoded on the light modulator is projected. In document DE 10 2006 004 300, titled "Projection device for the holographic reconstruction of scenes", the screen means is an optical element onto which a wave front of the scene encoded on the light modulator is projected. Document WO 2006/066919 filed by the applicant describes a method for computing video holograms.

A 'visibility region' is a limited region through which the observer can watch the entire reconstruction of the scene at sufficient visibility. Within the visibility region, the wave fields interfere such that the reconstructed scene becomes visible for the observer. The visibility region is located on or near the eyes of the observer. The visibility region can be moved in the x, y and z directions and is tracked to the actual observer position with the help of known position detection and tracking systems. It is possible to use two visibility regions, one for each eye. Generally, more complex arrangements of visibility regions are also possible. It is further possible to encode video holograms such that individual objects or the entire scene seemingly lie behind the light modulator for the observer.

In this document, the term 'light modulator means' or 'SLM' denotes a device for controlling intensity, colour and/or phase of light by way of switching, gating or modulating light beams emitted by one or multiple independent light sources. A holographic display device typically comprises a matrix of controllable pixels, which reconstruct object points by modifying the amplitude and/or phase of light which passes through the display panel. A light modulator means comprises such a matrix. The light modulator means may for example be an acousto-optic modulator AOM or a continuous-type modulator. One embodiment for the reconstruction of the holograms by way of amplitude modulation can take advantage of a liquid crystal display (LCD). The present invention also relates to further controllable devices which are used to modulate sufficiently coherent light into a light wave front or into a light wave contour.

The term 'pixel' denotes a controllable hologram pixel of the light modulator, it represents a discrete value of the hologram point and is addressed and controlled discretely. Each pixel represents a hologram point of the hologram. In the case of an LC display, a pixel is a discretely controllable display pixel. In the case of a DMD (Digital Micro-mirror Device), such as a DLP (Digital Light Processor), a pixel is a discretely controllable micro-mirror or small group of such mirrors. In the case of a continuous light modulator, a pixel is an imaginary region which represents the hologram point. In the case of a colour representation, a pixel is typically sub-divided into multiple sub-pixels, which represent the primary colours.

The term 'transformation' shall be construed such to include any mathematical or computational technique which is identical to or which approximates a transformation. Transformations in a mathematical sense are merely approximations of physical processes, which are described more precisely by the Maxwellian wave equations. Transformations such as Fresnel transformations or the special group of transformations which are known as Fourier transformations, describe second-order approximations. Transformations are usually represented by algebraic and non-differential equations and can therefore be handled efficiently and at high performance using known computing means. Moreover, they can be modelled precisely using optical systems.

Document WO 2006/066919 filed by the applicant describes a method for computing video holograms. It generally includes the steps of slicing the scene into section planes which are parallel to the plane of a light modulator, transforming all those section planes into a visibility region, and of adding them up there. Then, the added results are back-transformed into the hologram plane, where also the light modulator is disposed, thus determining the complex hologram values of the video hologram.

Document DE 10 2006 025 096 describes a method for rendering and generating video holograms in real time from image data with depth information, where a 3D rendering graphics pipeline, which describes the conversion of a three-dimensional scene into pixelated image data as two-dimensional projection of the three-dimensional scene, and which generates pixel values for the controllable pixels of a monitor in a first mode. It is characterised in that the pipeline is extended in a switchable manner such that in a second mode complex hologram values are generated as pixel values for a spatial light modulator SLM in at least one holographic pipeline, so that simultaneously or alternatively to the usual graphic representation the spatial light modulator is controlled with the hologram values in order to modulate an incident wave field such that the three-dimensional scene is reconstructed through interference in space.

Document DE 10 2006 042 324 describes a method for the real-time generation of video holograms. That method uses the principle that the reconstruction of a single object point only requires a sub-hologram as a subset of the entire hologram which is encoded on the SLM. It is characterised in that for each object point the contributions of the sub-holograms can be retrieved from look-up tables, and that said sub-holograms are accumulated so to form an entire hologram in order to reconstruct the entire scene.

The described methods allow the hologram values to be generated at a fast pace. However, it is necessary to include the 3D rendering graphics pipeline into further considerations. The results of a 3D rendering graphics pipeline, which describes the conversion of a three-dimensional scene into pixelated image data in the form of a two-dimensional projection of the three-dimensional scene, are provided in two memory sections, namely the frame buffer and the Z buffer:

The frame buffer comprises the colour values or colour information, i.e. the colour map of the scene as seen by the observer.
  The Z buffer comprises the depth map or depth information of the scene in a normalised representation, as seen from the observer position.

Those data serve as input information for the holographic pipeline, which follows in line, and which generates complex hologram values in the form of pixel values for the light modulator.

The former method for the generation of video holograms for interactive real-time representations can only be realised with great efforts being put into resources. As a result of the long computation times, video sequences and interactive three-dimensional real-time applications cannot be provided with the desired refresh frequency. As in conventional video technologies, a high image refresh rate is desired and indispensable when displaying computer-generated video holograms.

SUMMARY OF THE INVENTION

It is the object of the present invention to provide a method which significantly reduces the computing time required for the computation of the colour-related hologram values. The real-time capability of the method shall be substantiated. The costs and technical effort for the computation shall also be reduced in order to implement the method. Further, the architecture of graphics cards or 3D pipelines commercially available today shall be extended by additional hardware and software modules in order to further support colour video holograms to be generated in real time.

The method for generating video holograms according to this invention is suitable for holographic display devices with at least one light modulator means on which a scene which is divided into object points is encoded as an entire hologram and which can be seen as a reconstruction from a visibility region which lies within one periodicity interval of the reconstruction of the video hologram, where a sub-hologram is defined by the visibility region together with each object point of the scene to be reconstructed, where the entire hologram is formed by way of superposition of sub-holograms, and where a 3D rendering graphics pipeline structures a scene, which is represented by image data with depth information, into object points, and then computes and provides at least colour and depth information for the object points. In order to generate the colour video holograms, a 3D rendering graphics pipeline, which describes the conversion of the three-dimensional scene into pixelated image data for a two-dimensional projection of the three-dimensional scene, is extended.

Further, complex hologram values in the form of pixel values for a light modulator of a holographic display device are generated in a holographic pipeline from the resulting data of the 3D rendering graphics pipeline.

Such a holographic display device with corresponding light modulator means is therein also based on the principle to reconstruct mainly that wave front that would be emitted by an object towards observer eyes or into a visibility region. The definition of a visibility region has already been given above.

Further, advantage is taken of the principle that the reconstruction of an individual object point of a scene only requires a sub-hologram as a subset of the entire hologram encoded on the light modulator means. This principle also forms the first step of the method according to the present invention. Each single object point is created by one sub-hologram, whose position depends on the position of the object point, and whose size depends on the observer position. The region of the sub-hologram on the light modulator means will be referred to below as modulator region. The modulator region is that sub-region of the light modulator means which is required for reconstructing the object point. At the same time, the modulator region defines which pixels on the light modulator must be addressed in order to reconstruct that object point. The modulator region will remain in a fixed position if the object point is an object point which is fixed in space. This means that the object point to be reconstructed changes its position depending on the observer position. A change of the modulator region in dependence on the observer position allows the object point to be encoded at a fix position, i.e. its position in space does not change depending on the observer position. As far as the present invention is concerned, those principles can be applied analogously. This invention is further based on the principle that the entire hologram, which finally reconstructs the entire scene, can be computed by way of superposition of the sub-holograms.

The present invention is based on the idea that a holographic colour pipeline generates hologram values for the light modulator means for each primary colour, where the holographic colour pipelines determine the respective sub-holograms of the primary colours in parallel. A holographic colour pipeline represents a primary colour, which is represented by a characteristic wavelength. In a most simple case, this primary colour is one the known RGB primary colours from which all other colours can be mixed or generated by way of multiplexing. The individual colour holograms of an object point are thus provided simultaneously. The colour-related entire holograms of the entire scene are thus provided at the same time, as desired. Again, the entire hologram which corresponds to a primary colour can be computed as the sum of the colour-related sub-holograms.

The process steps will be explained below with the example of a holographic colour pipeline. The principle can be applied analogously to each primary colour used.

After the modulator region of an object point has been determined, the corresponding sub-hologram is computed and added as a contribution to the entire hologram. In a preferred embodiment, the sub-hologram of an object point can be retrieved from look-up-tables which have been generated in advance.

An extension of the 3D rendering graphics pipeline must be provided for the holographic colour pipelines to be executed in parallel. As already described above, the results of the 3D rendering graphics pipeline are provided in two memory sections, namely the frame buffer and the Z buffer.

In a first detailing of the present invention, the results of the 3D rendering graphics pipeline are stored for each primary colour in separate memory sections. The storage content is duplicated accordingly, so that each holographic pipeline is provided with an own frame buffer with the corresponding colour, and with an own Z buffer. This ensures that the holographic pipelines do not impair each other when accessing the input data and thus allow a high-performance access on those data.

In another preferred detailing of the present invention, the 3D rendering graphics pipeline stores the determined colour values and the determined depth values in an individual frame buffer and in an individual Z buffer, respectively, for each object point. In order to provide the holographic colour pipelines with data, a multiplexer is provided as control means which distributes and transfers the data to the parallel holographic colour pipelines.

The generated colour-related entire holograms are stored in storage means or transferred to the holographic display device. Colour holograms are presented in the display device based on the colour-specific entire holograms using time- or space division multiplexing methods.

The demands made on the generation of the colour-related hologram values in real time are particularly met thanks to the usage of the described methods for computing the sub-holograms. As in conventional video processing technologies, a high refresh rate can be provided for the display of computer-generated video holograms, where a real-time generation is also possible with the help of inexpensive and simple computing units.

The particularly preferred method for computing the complex hologram values will be further described below. The method is based on the idea that the complex hologram values of a sub-hologram are computed from the wave front of the object point to be reconstructed in a modulator region of the light modulator means in that the transmittance functions or modulation functions of an imaging element, which is modelled in the modulator region and in whose focal point the object point to be reconstructed lies, are computed and analysed. The imaging element is therein located in the hologram plane of the holographic display device. The hologram plane is defined by the position of a screen means, where for simplification the screen means will be the light modulator itself in the following description.

According to a preferred embodiment of the method, the imaging element includes a lens which is disposed in the hologram plane, which has the focal length f and which is inclined. An inclined lens is composed of a lens which is not inclined in relation to the hologram plane and a prism which is effective in both the horizontal and vertical direction. Strictly speaking, a prism does not define a sub-hologram, because no object point is reconstructed due to the non-focal prism function. However, in order to maintain a certain clarity of the inventive thought, this will be described so, because the prism also contributes its part to the complex hologram values in the modulator range.

For computing the complex values of the sub-hologram, this detailing of the method comprises the following steps for each visible object point of the scene:

A: Determining the size and position of the modulator region as described above, but the modulator region will then be given a local coordinate system, where the point of origin is located in its centre, the x axis describes the abscissa and the y axis describes the ordinate. 'a' is the half-width and 'b' the half-height of the modulator region, where those interval boundaries are included in the following terms.

B: Determining the sub-hologram of the lens in the hologram plane:

B1: Determining the focal length f of the lens:
The focal length f of the lens preferably is the normal distance of the object point to be reconstructed from the hologram plane.

B2: Complex values of the corresponding sub-hologram of the lens:
The complex values of the corresponding sub-hologram are determined using the equation:

$$z_L = \exp\{+/-i^*[(\pi/\lambda f)^*(x^2+y^2)]\},$$

where $\lambda$ is the reference wavelength, f is the focal length and (x, y) is the corresponding coordinate pair. The negative sign here is due to the characteristic of a concave lens. A convex lens would be identified by a positive sign.

B3: Thanks to the symmetry in regard to the x and y axes, it is sufficient to determine the complex values in one quadrant and to apply the values to the other quadrants by using a rule of sign.

C: Determining the sub-holograms of the prisms (P) in the hologram plane:
The chosen prisms run through the abscissa or ordinate, as shown in the figures below.

C1: Determining the linear factor $C_x$ of the prism (PH) with horizontal effective direction, which is described by the following equation in the interval $x \in [-a, a]$ $$C_x = M^*(2\pi/\lambda)$$

where M is the inclination of the prism.

C2: Determining the linear factor $C_y$ of the prism (PV) with vertical effective direction, which is described by the following equation in the interval $y \in [-b, b]$ $$C_y = N^*(2\pi/\lambda);$$

where N is the inclination of the prism.

C3: Determining the complex values of the corresponding sub-hologram of the combined prisms:
The complex values of the corresponding sub-hologram are found by superposing the two prism terms:

$$z_P = \exp\{i^*[C_x^*(x-a)+C_y^*(y-b)]\}$$

The superposed prism runs through the point of origin of the local coordinate system.

C4: A prism term can be omitted if the holographic display device exhibits the characteristic to image the light source into the visibility region.

D: Modulation of the sub-holograms for lens and prisms:

The complex values of the lens and prisms are complex multiplied in order to determine the combined sub-hologram:

$$z_{SH} = z_L * z_P$$

or, symbolically, $$SH = SH_L * SH_P$$

E: Application of the random phase:

Each modulated sub-hologram from step D is assigned with a random phase in order to ensure a homogeneous brightness distribution in the visibility region. The random phase is added to the sub-hologram by way of a complex multiplication:

$$z_{SH} := z_{SH} \exp(i\phi_0)$$

or, symbolically, $$SH := SH \exp(i\phi_0)$$

The random phase is individually assigned to each sub-hologram. Globally, the random phases of all sub-holograms are preferably distributed homogeneously.

F: Intensity modulation:

The complex values are given an additional multiplication factor, which represents the intensity or brightness.

$$z_{SH} = C * z_{SH}$$

or, symbolically, $$SH := C * SH$$

G: If the entire hologram is computed, the sub-holograms will be superposed so to form the entire hologram. In a simple embodiment, the sub-holograms are complexly added to the entire hologram, considering the position of the sub-holograms.

Entire hologram=complex sum of all sub-holograms with $$H\Sigma_{SLM} = \Sigma SH_i$$

or, symbolically, $$z_{SLM} = \Sigma z_{SHi}$$

(with regard to a global coordinate system)

The method is preferably used for visible object points only. The visibility of the object point is determined as a result of the rendering process of the scene by a 3D rendering graphics pipeline, and it depends on the observer position, that is the position of the eye pupils, and thus from the position of the visibility region, which is tracked to the position of the pupils.

The detailed description relates to the computation of the best possible solution. It is of course generally possible to replace the above-described function terms with more simple function terms, if a reduced reconstruction quality is accepted or even desired. However, it can be seen that updated process steps are applied in order to improve the reconstruction quality. Lenses or prisms can for example be chosen such to correct aberrations, tolerances of light modulator means etc. The same also applies to the exemplarily mentioned methods for determining the modulator region.

According to a continuation of the method, the pixel values for a specific holographic display device are found on the basis of the complex hologram values of the entire hologram. For example, the complex hologram values are converted into Burckhardt components, two-phase components or any other suitable code.

This method has the advantage that the object point to be reconstructed can be located at any position within the reconstruction space (frustum), and that its position is not approximated by way of discretisation, as for example when using section planes. In step (B1), the focal length f of the lens is exactly determined. Further, in step (C) the parameters of the prisms are exactly determined.

In addition to generating hologram values for the representation on a holographic display device, the method according to this invention is preferably used to fill look-up tables with the generated sub-holograms. This means that the sub-hologram for an object point is determined according to the above-described method and then stored in look-up tables. Such look-up table makes it possible to retrieve a preliminarily computed sub-hologram of an object point in accordance with its colour and depth information and to use it in the course of generating the hologram data. The look-up tables are preferably filled with the sub-holograms of the projection imaging element, that is of the combined lens and prism function. However, it is also thinkable that separate look-up tables are filled with sub-holograms related to the lens or prism functions, respectively. Generally, such look-up tables sustainably accelerate any other methods where the principle of sub-holograms is preferably employed as described for the method according to the present invention. Such look-up tables allow an acceleration of continuing methods or methods which require a great computational load, for example.

With the help of this method, object points for an interactive real-time holographic reconstruction can be generated at any position in the reconstruction space using standard hardware components which are commercially available today. If the processing unit on which the method is implemented has a higher performance, the scene can be structured more finely, and the quality of the reconstruction can be improved significantly. The method according to this invention omits complex transformations, which would otherwise be used, and it is characterised by a simple structure of steps which can be performed analytically.

This also substantiates the real-time capability of the method according to this invention.

BRIEF DESCRIPTION OF THE DRAWINGS

The invention will now be explained in more detail with the help of embodiments and in conjunction with the accompanying drawings, wherein.

DETAILED DESCRIPTION

Figure 1:
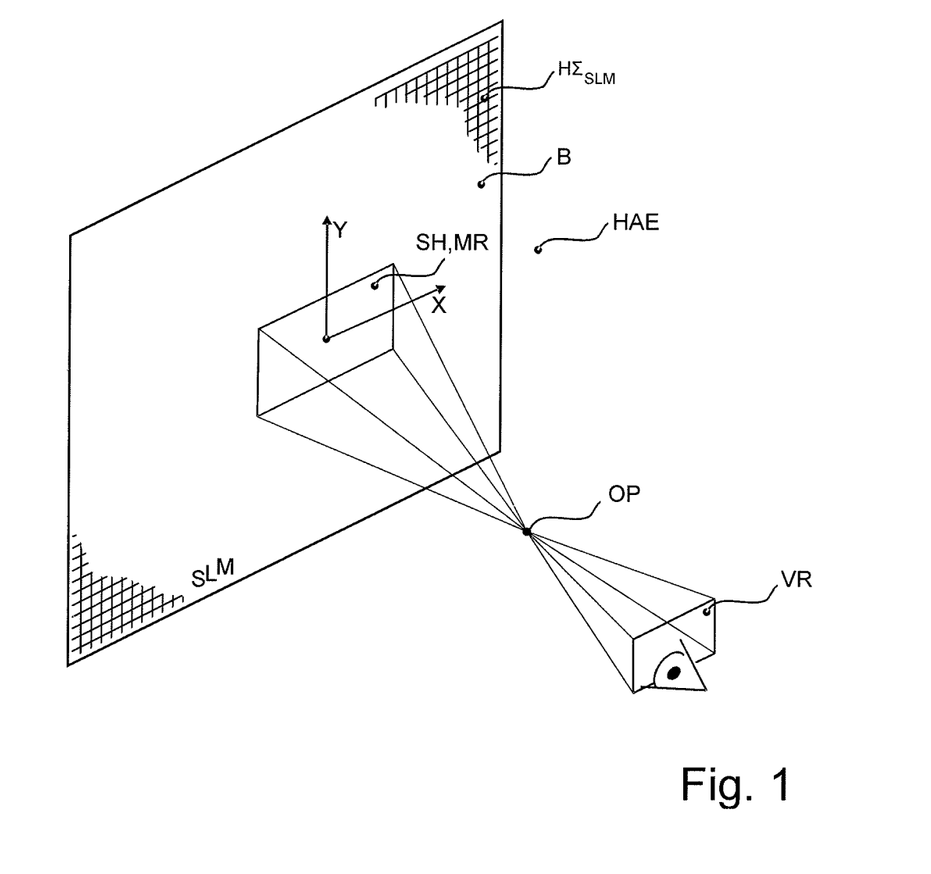
FIG. 1 illustrates the principle on which a holographic display device is based, and a modulator region representing an object point.

FIG. 1 illustrates the general principle on which a holographic display device (HAE) is based for one observer. The principle applies accordingly to multiple observers. The position of an observer is characterised by the position of his eye or his pupils (VP). The device comprises a light modulator means (SLM), which is identical to the screen means (B) in this embodiment in order to keep things simple; and it superposes the wave fronts which are modulated with information of object points of a scene (3D-S) in at least one visibility region (VR). The visibility region is tracked to the eyes. The reconstruction of a single object point (OP) of a scene (3D-S) only requires one sub-hologram (SH) as a subset of the entire hologram (H$\Sigma_{SLM}$) encoded on light modulator means (SLM). The modulator region (MR) is the region of the sub-hologram on the light modulator (SLM). As can be seen in this Figure, the modulator region (MR) only comprises a small subsection of the light modulator means (SLM). According to a most simple embodiment, the centre of the modulator region (MR) lies on the straight line through the object point (OP) to be reconstructed and through the centre of the visibility region (VR). In a most simple embodiment, the size of the modulator region (MR) is determined based on the theorem of intersecting lines, where the visibility region (VR) is traced back through the object point (OP) to be reconstructed to the light modulator means (SLM). Further, the indices of those pixels on the light modulator means (SLM) which are required to reconstruct this object point are thus determined. As can be seen in the Figure, the modulator region (MR) will be given a coordinate system, where the point of origin is located in its centre, the x axis describes the abscissa and the y axis describes the ordinate. The modulator region (MR) has the half-width 'a' and the half-height 'b'.

Figure 2A:
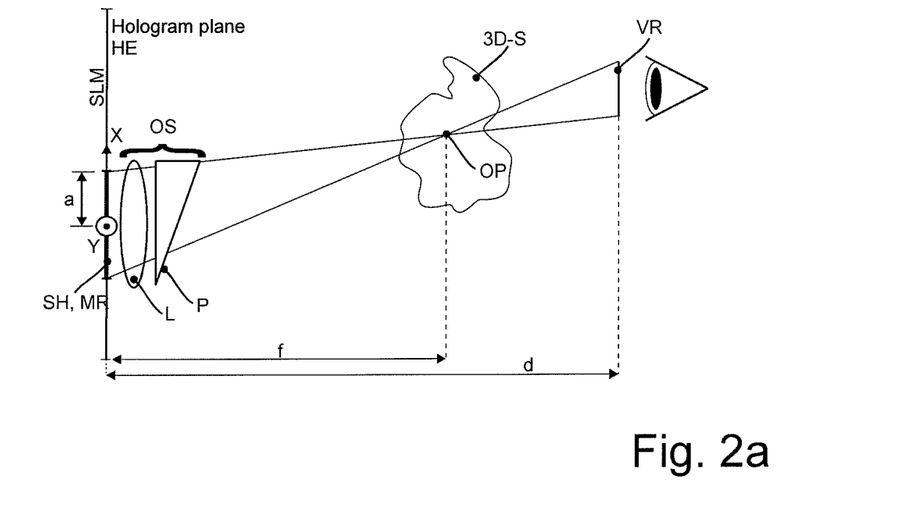
FIG. 2a is a side view of the display device with an imaging element comprising a lens and prism.

FIG. 2a is a side view of the holographic display device (HAE) that illustrates the general principle of the method. The modulator region (MR) is derived in analogy to what was said under FIG. 1. This region is located in the hologram plane (HE), where the light modulator (SLM) is disposed. The imaging element (OS), which is here composed of a focussing lens (L) and a prism (P), lies in the modulator region (MR). The Figure only shows the vertically effective prism wedge, and the imaging element (OS) is shown in front of the light modulator means (SLM) to make things clearer.

Figure 2B:
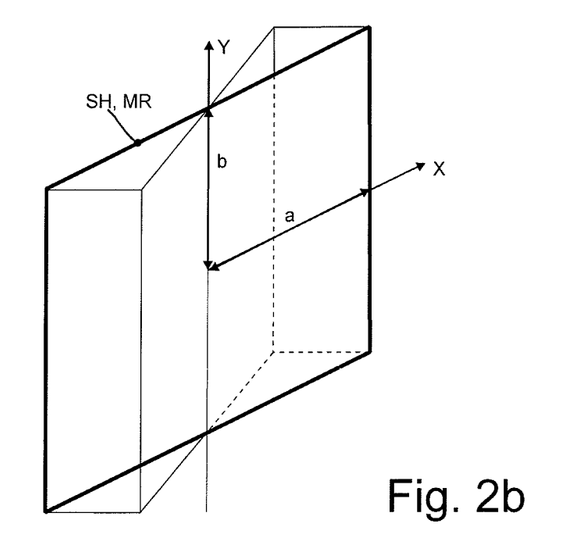
FIG. 2b shows a modulator region and a vertically effective prism.

FIG. 2b shows a horizontally effective prism wedge (PH) in front of the modulator region (MR) together with the coordinates and dimensions used. The prism wedge here runs through the ordinate.

Figure 2C:
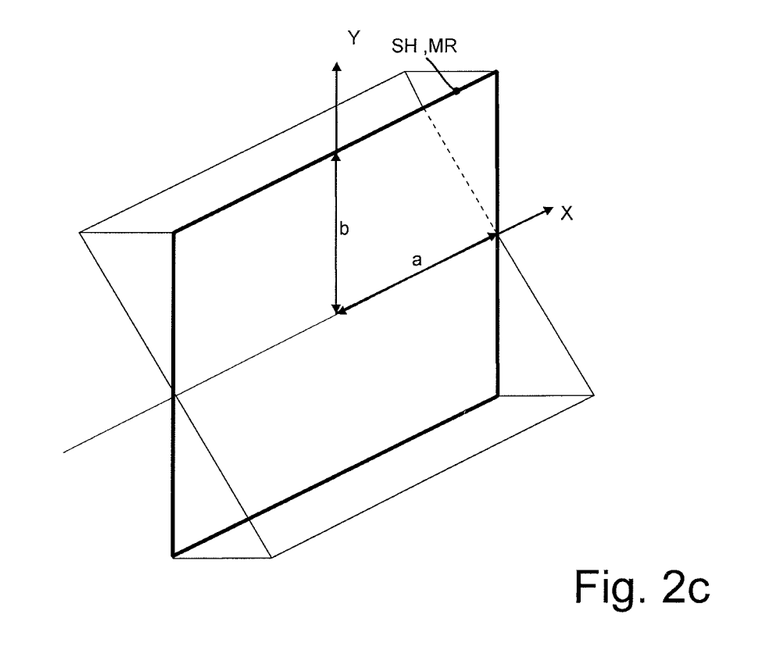
FIG. 2c shows a modulator region and a horizontally effective prism.

FIG. 2c analogously shows a vertically effective prism wedge (PV), which runs through the abscissa. The two prism wedges are superposed as described below.

Figure 3:
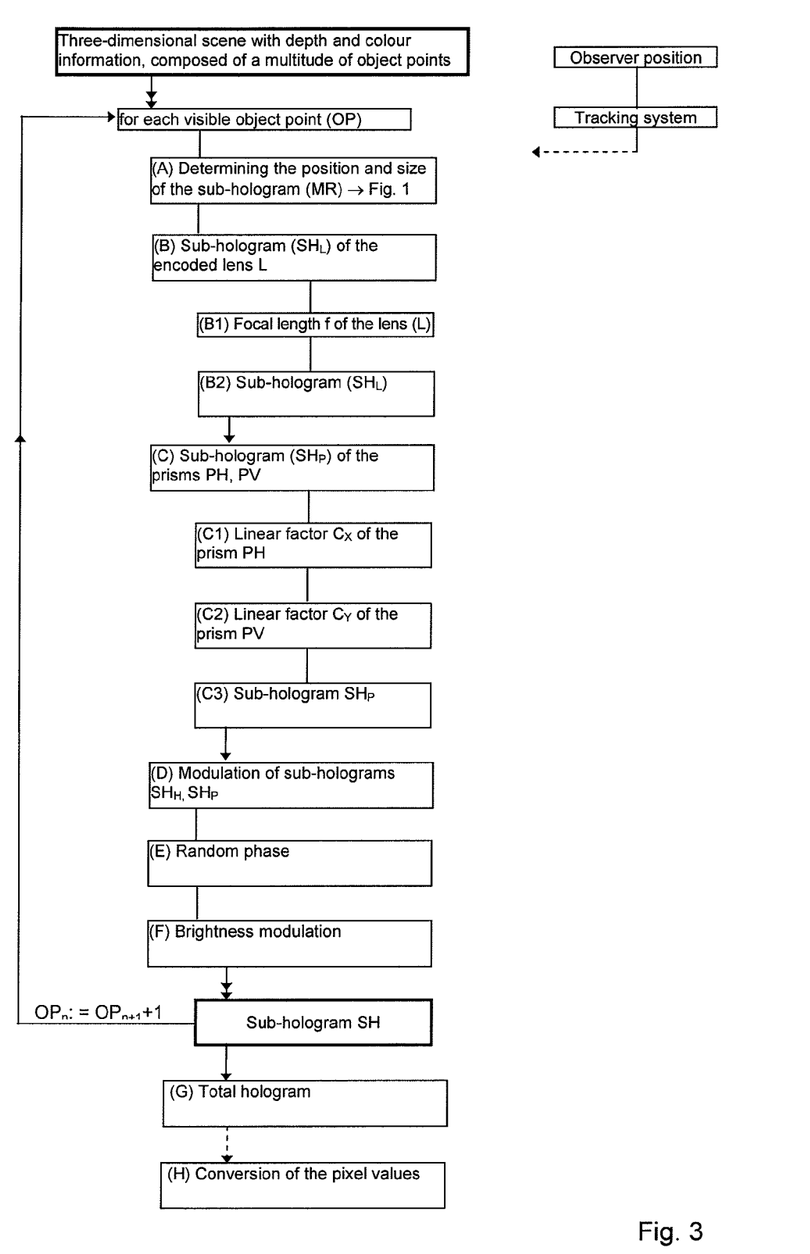
FIG. 3 shows a flowchart of the method according to this invention.

FIG. 3 shows a flowchart of the method according to the present invention. Starting point of the method is a three-dimensional scene (3D S) which is composed of a multitude of object points (OP). Colour and depth information is available for the object points (OP). The visibility of an object point is determined, based on its depth information, depending on the observer position, i.e. that of the eye pupils of the observer. In step (A), size and position of the respective modulator region (MR) in the hologram plane (HE) or on the light modulator means is determined for each visible object point. Following the idea of the invention, the object point (OP) to be reconstructed is interpreted as the focal point of an imaging element which is situated in the hologram plane, and the imaging element is considered to be a combination of a convex lens (L) and vertically and horizontally effective prisms (PV, PH), as shown in FIGS. 2b, 2c. The complex hologram values of the sub-hologram (SH) are computed in a modulator region (MR) of the light modulator means from the wave front of the object point (OP) to be reconstructed, in that the transmittance functions or modulation functions of the imaging element (OS), which is modelled in the modulator region (MR) and in whose focal point the object point (OP) to be reconstructed lies, are computed and analysed. In step (B1), the focal length of the lens (L) is thus determined for each visible object point as the normal distance of the object point (OP) from the hologram plane (HE).

In step (B2), the complex values for the corresponding sub-hologram (SH$_L$) are determined using the equation $$z_L = \exp\{-i*[(\pi/\lambda f)*(x^2+y^2)]\}$$

where $\lambda$ is the reference wavelength, f is the focal length and (x, y) is the corresponding local coordinate pair. The coordinate system is defined as described above.

In step (C), the sub-holograms (SH$_P$) of the prisms (P) in the hologram plane are determined. The linear factor C$_x$ of the prism (PH) with horizontal effective direction is determined using the equation C$_x$=M*(2$\pi$/$\lambda$), where M is the inclination of the prism. The linear factor C$_y$ of the vertically effective prism is found with an analogous equation, but with the inclination N. The complex values of the corresponding sub-hologram (SH$_p$) are determined by superposing the two prism terms:

$$SH_P := z_P = \exp\{i*[C_x*(x-a)+C_y*(y-b)]\}$$

One prism term can be omitted if the holographic display device exhibits the characteristic to image the light source into the visibility region (VR).

Now that the sub-holograms (SH$_L$) of the lens (L) and those (SH$_P$) of the prisms (P) are available, they are superposed in step (D) so to form the combined sub-hologram (SH) by complexly multiplying the complex values of the lens and of the prisms:

$$z_{SH} = z_L * z_P$$

or, symbolically, $$SH = SH_L * SH_P$$

In step (E), the sub-hologram (SH) is given a homogeneously distributed random phase.

In step (F), an intensity modulation is performed, where the sub-hologram (SH) is multiplied with an intensity factor:

$$z_{SH} = C * z_{SH}$$

or, symbolically, $$SH := C * SH$$

The combined sub-hologram (SH) of an object point (OP) is now completely available.

In a further process step (G), which may be performed separately, the sub-holograms of the object points are added so to form an entire hologram (H$\Sigma_{SLM}$). The individual sub-holograms (SH$_i$) of the object points are superposable and are complexly added so to form the entire hologram (H$\Sigma_{SLM}$).

Entire hologram=complex sum of all sub-holograms of the object points with $$H\Sigma_{SLM} = \Sigma SH_i$$

or $$z_{SLM} = \Sigma z_{SHi}$$

(with regard to a global coordinate system).

The entire hologram (H$\Sigma_{SLM}$) represents the hologram of all object points. It thus represents and reconstructs the entire scene (3D-S).

In a final step (H), as already described above, the entire hologram can by way of encoding be transformed into pixel values for a holographic display device which also preferably employs of the principle of sub-holograms. These are in particular, as already mentioned above, devices described in documents WO 2004/044659, WO 2006/027228, WO 2006119760, and DE 10 2006 004 300.

Figure 4:
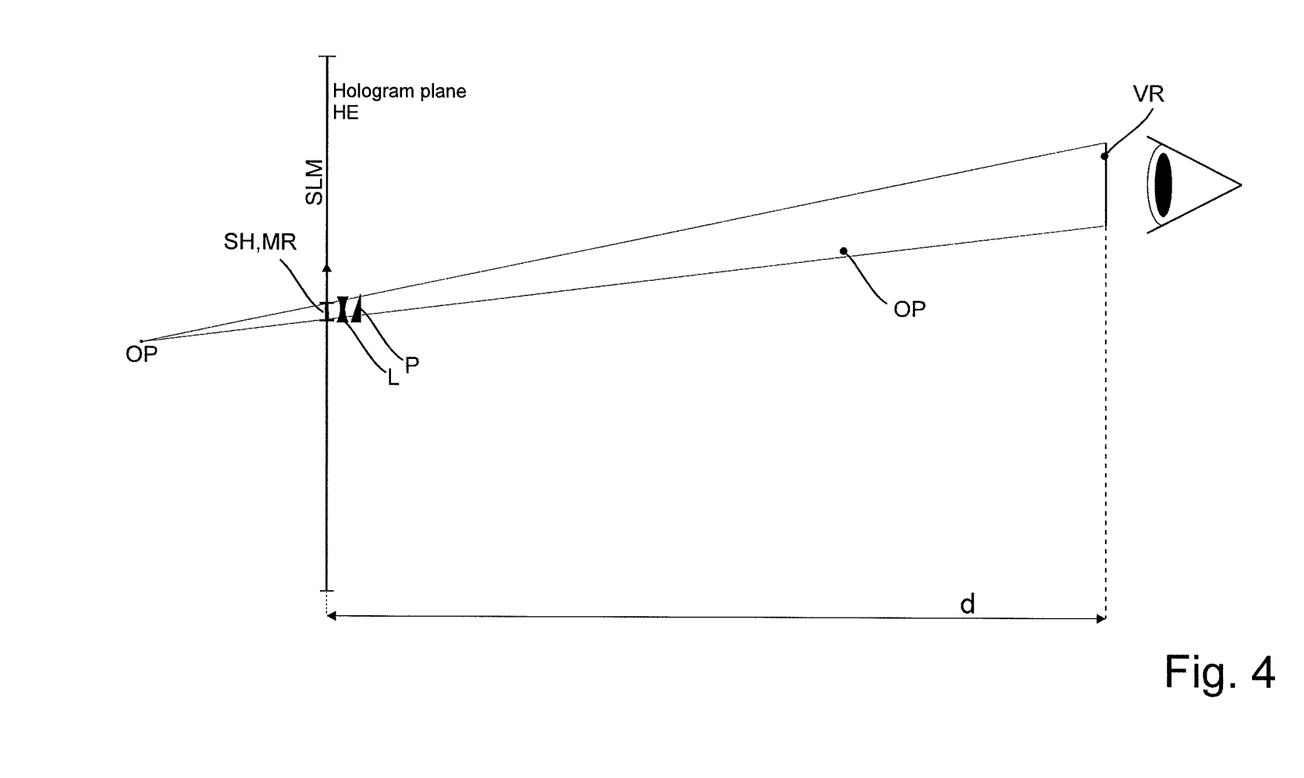
FIG. 4 shows an option of the method for the reconstruction of an object point behind the hologram plane.

FIG. 4 illustrates that by applying the method object points (OP) which are situated behind the hologram plane (HE) can generally be reconstructed analogously. In that case, the imaging element (OS) analogously comprises the mentioned prisms (P), but the lens in the imaging element is a concave lens (L), for which the wave front can be determined in the same way in the modulator region.

Figure 5:
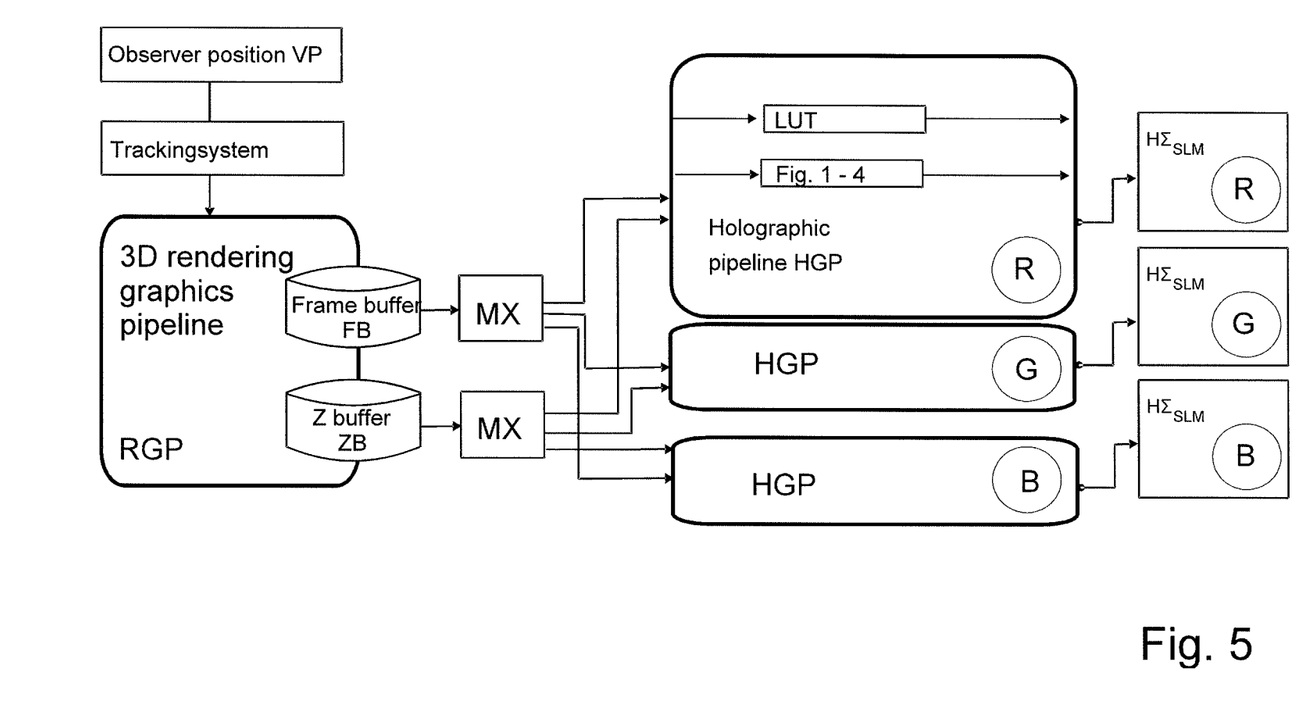
FIG. 5 is a flowchart of a preferred embodiment of the method and the colour-related extension of a 3D rendering graphics pipeline with a holographic pipeline.

FIG. 5 illustrates the method for generating the entire hologram ($H\Sigma_{SLM}$) and shows how a 3D rendering graphics pipeline (RGP) is extended by a holographic pipeline (HGP) in order to generate the complex hologram values for the light modulator (SLM) of the holographic display device (HAE) from the image data with depth information.

For example, the conversion of screen coordinates into device coordinates, texturing, clipping and anti-aliasing are performed in the 3D rendering graphics pipeline (RGP). The results of the 3D rendering graphics pipeline (RGP), which describes the conversion of the scene (3D-S) into pixelated image data in the form of a two-dimensional projection of the scene, are provided in two memory sections:

The frame buffer (FB) comprises the colour values, i.e. the colour map of the scene seen by the observer.

The Z buffer (ZB) comprises the depth map of the scene in a normalised representation, as seen from the observer position.

To facilitate understanding, those memory sections of the graphics pipeline are indicated separately and are shown schematically in FIG. 5. Those data serve as input information for the subsequent holographic colour pipelines (HGP), which generate the complex hologram values for the entire scene (3D-S) in a colour-specific manner. As can be seen in the Figure, one holographic colour pipeline (HGP) is provided for one primary colour, here RGB. Each of those holographic colour pipelines thus corresponds to a characteristic wavelength. Those colour-related graphics pipelines (HGP), which are indicated by an additional mark for the primary colour in the Figure, work in parallel. This ensures that the individual colour holograms of an object point and finally the colour-related entire holograms of the entire scene are provided simultaneously. In order to provide the individual holographic pipelines with the data of the frame buffer (FB) and Z buffer (ZB), a multiplexer (MX), which distributes the data accordingly to the individual colour-related holographic pipelines, is provided as a control means. As already described above, the colour-related entire hologram ($H\Sigma_{SLM}$), which finally reconstructs the entire scene (3D-S), can be determined as the sum of the respective colour-related sub-holograms using the equation $H\Sigma_{SLM} = \Sigma SH_i$. The colour representation is performed in the holographic display device by way of time- or space division multiplexing of the colour-related entire holograms.

The upper holographic pipeline in the Figure illustrates different methods for determining the sub-hologram of an object point. In a first option, the sub-hologram of an object point can be retrieved from one or multiple look-up-tables (LUT) which have been generated in advance. Another option is formed by the method described in FIGS. 1 to 4.

Referring to this Figure, the 3D rendering graphics pipeline and the holographic pipelines are shown separately in order to ensure clear understanding of the basic principle; however, it does not necessarily mean that the implemented computing means are spatially separated. The method is preferably implemented on the same processor or graphics chip on which also the 3D rendering graphics pipeline operations are run. The 3D rendering graphics pipeline is preferably extended as regards hardware and software. However, an implementation of the holographic pipelines on an additional chip forms a preferred possible option.

In a preferred embodiment of the present invention, the holographic display device provides its configuration data to the device for implementing the method. Those data for example specify the size of the light modulator, its resolution and, if necessary, descriptive data concerning the encoding method, e.g. the Burckhardt encoding method, two-phase encoding method or other suitable encoding methods. The generation of the hologram values can thus be configured and adapted to the given or detected holographic display device. A device for implementing the method is thus not only limited to a particular holographic display device, but can be used universally in devices which preferably take advantage of the basic principle of sub-holograms.

LIST OF REFERENCE NUMERALS

3D-S Scene, composed of object points
RGP 3D rendering graphics pipeline
FB Frame buffer of the 3D rendering graphics pipeline
ZB Z buffer of the 3D rendering graphics pipeline
HGP Holographic pipeline
MX Multiplexer
HAE Holographic display device with
B Screen means
SLM Light modulator means
HE Hologram plane
VP Observer eyes/observer position
VR Visibility region(s)
OP Object point, general
$OP_n$ Object point, with reference index
SH Sub-hologram, general
$SH_L$ Sub-hologram of a lens
$SH_P$ Sub-hologram of a prism
MR Modulator region
$SH_i$ Sub-hologram, general, indexed
$H\Sigma_{SLM}$ Entire hologram
OS Projection element
L Lens
P Prism
PH Prism with horizontal effective direction
PV Prism with vertical effective direction

The invention claimed is:

1. A method for rendering and generating colour video holograms for a holographic display device with at least one light modulator means on which a scene which is divided into object points is encoded as an entire hologram and which can be seen as a reconstruction from a visibility region which lies within one periodicity interval of the reconstruction of the video hologram, comprising:
defining a sub-hologram, together with each object point of the scene to be reconstructed with the visibility region;
forming the entire hologram using a superimposition of sub-holograms;
where a 3D rendering graphics pipeline structures a scene, which is represented by image data with depth information, into object points, and determines and provides at least colour and depth information for the object points;
where one holographic colour pipeline for each primary colour generates colour-related hologram values in that for each visible object point the complex hologram values of the sub-hologram can be retrieved from at least one look-up table, or are determined analytically from the wave front of the object point to be reconstructed in a modulator region of the light modulator means; and where the holographic colour pipelines execute the computation of the respective, superimposed entire holograms in parallel.

2. The method according to claim 1, wherein the 3D rendering graphics pipeline writes for each object point the determined colour values to a frame buffer and the determined depth values to a Z buffer in storage means which are separate for each primary colour, and where the holographic colour pipelines access the respective storage means.

3. The method according to claim 1, wherein the 3D rendering graphics pipeline writes for each object point the determined colour values to a frame buffer and the determined depth values to a Z buffer for each primary colour in storage means, and where at least one multiplexer as a control means distributes and transfers those data to the respective parallel colour pipelines.

4. The method according to claim 3, wherein each holographic colour pipeline has a frame buffer and a Z buffer, and where at least one multiplexer as a control means distributes and transfers the results of the 3D rendering graphics pipeline to those memory sections of the colour pipeline.

5. The method according to claim 1, wherein the complex hologram values of a sub-hologram are determined in a modulator region of the light modulator means from the wave front of the object point to be reconstructed, in that the transmittance functions or modulation functions of an imaging element, which is modelled in the modulator region and in whose focal point the object point to be reconstructed lies, are computed and analysed.

6. The method according to claim 5, wherein the imaging element comprises at least one lens.

7. The method according to claim 6, wherein the imaging element additionally comprises at least one prism.

8. The method according to claim 7, wherein the imaging element comprises a lens and at least one prism, said method comprising the following steps for each visible object point of the scene:

A: Determining the size and position of the sub-hologram as a modulator region, which is given the half-width 'a' and the half-height 'b', and which is given local coordinates;

B: Determining the sub-hologram of the lens in the modulator region, comprising the steps of:

B1: Determining the focal length f of the lens preferably as the normal distance of the object point to be reconstructed from the modulator region;

B2: Determining the complex values of the corresponding sub-hologram of the lens using the equation $z_L = \exp\{+/-i*[(\pi/\lambda f)*(x^2+y^2)]\}$, where $\lambda$, is the reference wavelength, f is the focal length and (x, y) is the corresponding coordinate pair, and where the sign indicates a concave/convex lens;

C: Determining the sub-hologram of the prisms in the modulator region, comprising the steps of:

C1: Determining the linear factor $C_x$ of the prism with horizontal effective direction, which is described by the following equation in the interval $x \in [-a, a]$ $C_x = M*(2\pi/\lambda)$, where M is the inclination of the prism;

C2: Determining the linear factor $C_y$ of the prism (PV) with vertical effective direction, which is described by the following equation in the interval $y \in [b, b]$ $C_y = N*(2\pi/\lambda)$, where N is the inclination of the prism;

C3: Determining the complex values of the corresponding sub-hologram of the combined prisms by superimposing the two prism terms $z_P = \exp\{i*[C_x*(x-a)+C_y*(y-b)]\}$ D: Modulation of the sub-hologram of the lens and of the sub-hologram of the prisms, where the complex values of the lens and of the prisms are multiplied with $z_{SH} = z_L * z_P$ or, symbolically, $SH = SH_L * SH_P$ E: Application of the random phase, where each modulated sub-hologram is assigned with a random phase $\Phi_z$, and where a complex multiplication is performed with $z_{SH} := z_{SH} * \exp(i\Phi_z)$, or $SH := SH * \exp(i\Phi_z)$;

F: Intensity modulation, where the values of the modulated sub-hologram are given a real intensity factor C with $z_{SH} := C * z_{SH}$ or $SH := C * SH$.

9. The method according to claim 1, wherein the position of the modulator region is determined such that the centre of the modulator region lies on the straight line through the object point to be reconstructed and the centre of the visibility region.

10. The method according to claim 1, wherein the size of the modulator region is determined by tracing back the visibility region through the object point to the light modulator means.

11. The method according to claim 8, wherein, considering the position of the sub-holograms, their superimposition to form a entire hologram is computed as the complex sum of the sub-holograms with $H\Sigma_{SLM} = \Sigma SH_i$.

12. The method according to claim 8, wherein each modulated sub-hologram of an object point is given a random phase, and the random phases of all sub-holograms are evenly distributed.

13. The method according to claim 1, wherein the complex hologram values are additionally colour-specifically converted into pixel values of the light modulator means.

14. The method according to claim 13, wherein the complex hologram values are converted into Burckhardt components or two-phase components or any other suitable code.

15. The method according to claim 1, wherein a defined space is structured into object points, and where the sub-hologram for each object point is colour-specifically stored in a look-up table.

16. The method according to claim 1, wherein a defined space is structured into object points, and where for each object point the sub-hologram which is related to at least one component of the imaging element is colour-specifically determined and stored in corresponding look-up tables.

17. A holographic display device with a screen means, said device configured to perform the following steps:

defining a sub-hologram, together with each object point of the scene to be reconstructed with the visibility region;

forming the entire hologram using a superimposition of sub-holograms;

where a 3D rendering graphics pipeline structures a scene, which is represented by image data with depth information, into object points, and determines and provides at least colour and depth information for the object points;

where one holographic colour pipeline for each primary colour generates colour-related hologram values in that for each visible object point the complex hologram values of the sub-hologram can be retrieved from at least one look-up table, or are determined analytically from the wave front of the object point to be reconstructed in a modulator region of the light modulator means; and where the holographic colour pipelines execute the computation of the respective, superimposed entire holograms in parallel;

wherein the screen means is either the light modulator means itself on which the hologram of the scene is encoded, or an optical element onto which a hologram encoded on the light modulator or a wave front of the scene encoded on the light modulator means is imaged.

18. The holographic display device according to claim 17, wherein the optical element is a lens or a mirror.

* * * * *